United States Patent
Ochi et al.

(10) Patent No.: US 11,584,836 B2
(45) Date of Patent: *Feb. 21, 2023

(54) DECORATIVE FILM, COMPOSITION, METHOD FOR PRODUCING DECORATIVE FILM, AND METHOD FOR PRODUCING THREE-DIMENSIONAL MOLDED PRODUCT PROVIDED WITH DECORATIVE FILM

(71) Applicant: AGC Inc., Tokyo (JP)

(72) Inventors: Shuhei Ochi, Tokyo (JP); Shiori Yoshigami, Tokyo (JP); Shun Saito, Tokyo (JP)

(73) Assignee: AGC Inc., Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 17/117,896

(22) Filed: Dec. 10, 2020

(65) Prior Publication Data
US 2021/0095084 A1 Apr. 1, 2021

Related U.S. Application Data

(63) Continuation of application No. PCT/JP2019/023334, filed on Jun. 12, 2019.

(30) Foreign Application Priority Data
Jun. 13, 2018 (JP) .............. JP2018-113191

(51) Int. Cl.
*C08J 5/18* (2006.01)
*B29C 51/10* (2006.01)
(Continued)

(52) U.S. Cl.
CPC .......... *C08J 5/18* (2013.01); *B29C 51/10* (2013.01); *B29C 51/12* (2013.01); *B29C 51/14* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 11,173,695 B2 * | 11/2021 | Ochi | C08J 7/0427 |
| 2016/0347042 A1 * | 12/2016 | Walker, Jr. | B32B 27/14 |
| 2020/0157372 A1 * | 5/2020 | Fukada | C08G 18/792 |

FOREIGN PATENT DOCUMENTS

| | | | |
|---|---|---|---|
| JP | 2014-184726 A | 10/2014 | |
| WO | WO-2018193926 A1 * | 10/2018 | C08F 214/18 |

OTHER PUBLICATIONS

International Search Report dated Jul. 23, 2019 in PCT/JP2019/023334 filed Jun. 12, 2019, 1 page.

* cited by examiner

*Primary Examiner* — Ramsey Zacharia
(74) *Attorney, Agent, or Firm* — Element IP, PLC

(57) ABSTRACT

To provide a decorative film whereby cracking is suppressed when the decorative film is adhered to a three-dimensional molded product while it is being stretched or in a stretched state. To further provide a composition, a method for producing the decorative film, and a method for producing a three-dimensional molded product provided with the decorative film. The decorative film has at least a base film and a fluororesin layer containing a fluororesin having a crosslinked structure, characterized in that the fluororesin layer contains a urethane bond and an allophanate bond, and the average molecular weight between crosslinking-points of the fluororesin layer is more than 50,000 and at most 100,000.

11 Claims, 1 Drawing Sheet

(51) Int. Cl.
*B29C 51/14* (2006.01)
*B29C 65/00* (2006.01)
*B32B 7/12* (2006.01)
*B32B 27/08* (2006.01)
*B32B 27/26* (2006.01)
*B32B 27/30* (2006.01)
*B32B 27/32* (2006.01)
*C08L 27/12* (2006.01)
*C08F 214/24* (2006.01)
*C09D 127/12* (2006.01)
*B29C 55/02* (2006.01)
*B29C 63/02* (2006.01)
*C08G 18/62* (2006.01)
*B29C 51/12* (2006.01)

(52) U.S. Cl.
CPC ............... *B29C 66/71* (2013.01); *B32B 7/12* (2013.01); *B32B 27/08* (2013.01); *B32B 27/26* (2013.01); *B32B 27/304* (2013.01); *B32B 27/322* (2013.01); *C08L 27/12* (2013.01); B32B 2305/72 (2013.01); B32B 2327/12 (2013.01); B32B 2451/00 (2013.01); B32B 2605/003 (2013.01)

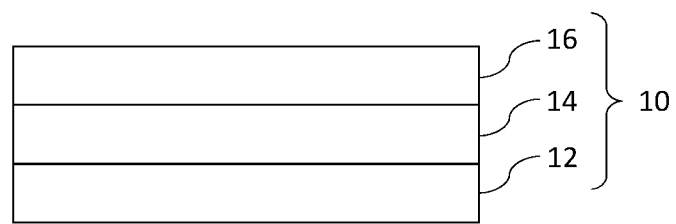

DECORATIVE FILM, COMPOSITION, METHOD FOR PRODUCING DECORATIVE FILM, AND METHOD FOR PRODUCING THREE-DIMENSIONAL MOLDED PRODUCT PROVIDED WITH DECORATIVE FILM

TECHNICAL FIELD

The present invention relates to a decorative film, a composition, a method for producing a decorative film, and a method for producing a three-dimensional molded product provided with a decorative film.

BACKGROUND ART

The surface of a three-dimensional molded product to be used in the field of automobile interior and exterior products, etc. may sometimes be decorated by a decorative film for the purpose of imparting a design property or protecting the surface. Patent Document 1 discloses a decorative film having a layer containing polyvinylidene fluoride.

PRIOR ART DOCUMENT

Patent Document

Patent Document 1: JP-A-2014-184726

DISCLOSURE OF INVENTION

Technical Problem

The above-mentioned decorative film is adhered to a three-dimensional molded product while it is being stretched or in a stretched state. However, it has been found that when a decorative film having a layer containing polyvinylidene fluoride as described in Patent Document 1 is adhered to a three-dimensional molded product while it is being stretched or in a stretched state, cracking may sometimes occur in the decorative film.

The present invention has an object to provide a decorative film whereby cracking is suppressed when it is adhered to a three-dimensional molded product while it is being stretched or in a stretched state. Further, the present invention also has an object to provide a composition, a method for producing a decorative film, and a method for producing a three-dimensional molded product provided with a decorative film.

Solution to Problem

As a result of intensive studies, the present inventors have found that the problem can be solved by the following constructions.
[1] A decorative film having a base film and a fluororesin layer containing a fluororesin having a crosslinked structure, characterized in that the fluororesin layer contains a urethane bond and an allophanate bond, and the average molecular weight between crosslinking points of the fluororesin is more than 50,000 and at most 100,000.
[2] The decorative film according to [1], wherein the crosslinked structure is a co-crosslinked structure of a fluorinated polymer containing units based on a fluoroolefin and units having a first crosslinkable group, a non-fluorinated compound having a second crosslinkable group, and a curing agent having at least two groups capable of reacting with each of the first crosslinkable group and the second crosslinkable group.
[3] The decorative film according to [2], wherein the content of the units having the first crosslinkable group is from 3 to 30 mol % to all units which the fluorinated polymer contains.
[4] The decorative film according to [2] or [3], wherein both the first crosslinkable group and the second crosslinkable group are hydroxy groups, and the curing agent is polyisocyanate.
[5] The decorative film according to [4], wherein the curing agent is a curing agent containing an adduct body of polyisocyanate and an allophanate body of polyisocyanate.
[6] The decorative film according to [5], wherein the mass ratio of the allophanate body to the adduct body is from 0.1 to 9.0.
[7] The decorative film according to any one of [2] to [6], wherein the ratio of the number average molecular weight of the fluorinated polymer to the average molecular weight between crosslinking points of the fluororesin is from 0.01 to 15.
[8] The decorative film according to any one of [2] to [7], wherein the number average molecular weight of the fluorinated polymer is from 3,000 to 30,000.
[9] The decorative film according to any one of [1] to [8], which is used for decorating a three-dimensional molded product used for an automobile exterior part or an automobile interior part.
[10] A composition comprising a fluorinated polymer containing units based on a fluoroolefin and units based on a monomer having a hydroxy group, a non-fluorinated compound having a hydroxy group, an adduct body of polyisocyanate, and an allophanate body of polyisocyanate, characterized in that
the number average molecular weight of the fluorinated polymer is from 3,000 to 30,000, and
the weight average molecular weight of the non-fluorinated compound having a hydroxy group is from 30,000 to 90,000.
[11] The composition according to [10], wherein both the hydroxy value of the fluorinated polymer and the hydroxy value of the non-fluorinated compound are from 10 to 150 mgKOH/g.
[12] The composition according to [10] or [11], wherein the mass ratio of the allophanate body to the adduct body is from 0.1 to 9.0.
[13] A method for producing a decorative film, which comprises applying the composition as defined in any one of [10] to [12] onto one surface of a base film and curing it, to form a fluororesin layer containing a fluororesin having a crosslinked structure, which contains a urethane bond and an allophanate bond, and in which the average molecular weight between crosslinking points is more than 50,000 and at most 100,000, thereby to obtain a decorative film having the base film and the fluororesin layer disposed on one surface of the base film.
[14] A method for producing a three-dimensional molded product provided with a decorative film, which comprises press-bonding the decorative film as defined in any one of [1] to [9] and a surface to be decorated of a three-dimensional molded product, under reduced pressure, to obtain the three-dimensional molded product provided with the decorative film, having the fluororesin layer on the outermost surface.

Advantageous Effects of Invention

According to the present invention, it is possible to provide a decorative film whereby cracking is suppressed when it is adhered to a three-dimensional molded product while it is being stretched or in a stretched state. Further, according to the present invention, it is possible to provide a composition, a method for producing a decorative film, and a method for producing a three-dimensional molded product provided with a decorative film.

BRIEF DESCRIPTION OF DRAWING

FIG. 1 is a schematic side view showing an example of a layered structure of a decorative film of the present invention.

DESCRIPTION OF EMBODIMENTS

The meanings of the terms in the present invention are as follows.

A (meth)acrylate is a general term for an acrylate and a methacrylate. Similarly, (meth)acrylic acid is a general term for acrylic acid and methacrylic acid, and (meth)acrylamide is a general term for acrylamide and methacrylamide. Further, a (meth)acrylic resin means a resin made of a polymer composed mainly of units based on a (meth)acrylate.

A unit is a general term for an atomic group based on one molecule of a monomer, which is directly formed by polymerizing the monomer, and an atomic group obtained by chemically converting a part of the atomic group. The content (mol %) of each unit to all units which the polymer contains, is obtainable by analyzing the polymer by a nuclear magnetic resonance spectrum (NMR) method.

An acid value and a hydroxy value are, respectively, values measured in accordance with the method of JIS K 0070-3 (1992).

A glass transition temperature is a midpoint glass transition temperature of a polymer measured by a differential scanning calorimetry (DSC) method. The glass transition temperature may be referred to also as Tg.

A softening temperature is a value measured in accordance with the method of JIS K 7196 (1991).

A number average molecular weight and a weight average molecular weight are values measured by gel permeation chromatography using polystyrene as a standard substance. The number average molecular weight may be referred to also as Mn, and the weight average molecular weight may be referred to also as Mw.

An average molecular weight between crosslinking points is a value measured by a dynamic viscoelasticity measuring device. The average molecular weight between crosslinking points may be referred to also as Mc.

In Examples of the present invention, Mc was calculated by the formula E'min=3 pRT/Mc from the minimum value (E'min) of the storage elastic modulus E', the density (p) of a sample, the gas constant (R) and the absolute temperature (T) of E'min by measuring the storage viscoelasticity E' (unit: Pa) of the sample (fluororesin) under the following conditions using a dynamic viscoelasticity measuring device (DMS7100, manufactured by Seiko Instruments Inc.).
(Measurement Conditions)
  Grip distance: 30 mm
  Temperature rising rate: 2° C./min
  Measuring temperature range: from 30 to 150° C.
  Frequency: 1 Hz The thickness of the decorative film is a value measured by using an eddy current type film thickness meter. As the eddy current type film thickness meter, for example, EDY-5000 manufactured by Sanko Denshi Co., Ltd. may be used. The thickness of each layer in the decorative film can be calculated from the ratio of the thicknesses of the respective layers obtainable by observing the cross section of the decorative film by a scanning electron microscope equipped with an energy dispersive X-ray analyzer, and the thickness of the decorative film.

The total light transmittance is a value measured by a D light source in accordance with JIS K 7361-1:1997.

When the composition contains the solvent, the mass of the solid content of the composition is the mass obtained by removing the solvent from the composition. Here, components constituting the solid content of the composition other than the solvent are regarded as the solid content even if their properties are liquid. Here, the solid content of the composition is obtainable as the mass remaining after heating 1 g of the composition at 130° C. for 20 minutes.

The decorative film of the present invention (hereinafter referred to also as the present decorative film) has a base film and a fluororesin layer containing a fluororesin having a crosslinked structure.

The fluororesin layer contains a urethane bond and an allophanate bond.

Mc of the fluororesin is more than 50,000 and at most 100,000.

When the present decorative film having such a construction is adhered to a three-dimensional molded product while it is being stretched or in a stretched state, cracking will be suppressed. The mechanism is not necessarily clear, but it is considered as follows.

In a case where the decorative film is used by being stretched and adhered to a three-dimensional molded product, it is considered that the decorative film comes into contact with the three-dimensional molded product in the stretched state and then slightly shrinks to follow and adhere. Here, it is considered that cracking will take place in the decorative film in a case where disturbance occurs in the directionality of the energy generated in the fluororesin layer of the decorative film in the stretched state (particularly, the restoring force of the stretched decorative film to shrink).

The present decorative film is excellent in stretchability, as Mc of the fluororesin is relatively large at a level of more than 50,000 and at most 100,000. At the same time, since the fluororesin layer contains a urethane bond and an allophanate bond, the directionality of the force generated in the fluororesin layer will be controlled even when the present decorative film is stretched. Therefore, in a case where the decorative film is used by being stretched and adhered to a three-dimensional molded product, cracking of the decorative film is considered to be suppressed.

First, the structure of the present decorative film will be described with reference to the drawing.

FIG. 1 is a schematic side view showing a layered structure of a decorative film 10 which is another embodiment of the present invention. The decorative film 10 has a bonding layer 12, a base film 14 and a fluororesin layer 16, and the respective layers are arranged in this order.

When the bonding layer 12 of the decorative film 10 and the surface to be decorated of a three-dimensional molded product (as described later) are press-bonded under reduced pressure, it is possible to obtain the three-dimensional molded product provided with the decorative film, in which the fluororesin layer 16, the base film 14, the bonding layer 12 and the three-dimensional molded product are arranged in this order. Thus, the fluororesin layer 16 is located at the outermost surface of the three-dimensional molded product provided with the decorative film.

Hereinafter, the respective members constituting the present decorative film will be described in detail.

The base film functions as a support material for supporting the respective layers at the time of producing the present decorative film.

Specific examples of the material constituting the base film include a vinyl chloride resin, a polyester resin, an ABS resin (acrylonitrile/butadiene/styrene copolymer), an AAS resin (acrylonitrile/acrylic acid ester/styrene copolymer), an AES resin (acrylonitrile/ethylene-propylene-diene/styrene copolymer), a (meth)acrylic resin, an olefin resin, and a fluororesin containing a fluorinated polymer (for example, a non-crosslinkable fluorinated polymer, a polyvinylidene fluoride, etc.) other than the later-described fluorinated polymer. Among them, the material constituting the substrate film preferably contains at least one member selected from the group consisting of a vinyl chloride resin, a polyester resin, an ABS resin, a (meth)acrylic resin and the above non-crosslinkable fluorinated polymer.

The thickness of the base film is preferably from 10 to 500 μm, particularly preferably from 20 to 100 μm.

The base film may have a concavo-convex pattern on at least one surface. The concavo-convex pattern can be formed by a processing method such as embossing processing, hairline processing or chemical etching processing.

Since the fluororesin layer in the present decorative film contains a fluororesin having a crosslinked structure, it is excellent in antifouling property, durable weather resistance and chemical resistance. Therefore, a three-dimensional molded product provided with a decorative film having the fluororesin layer also has the same effects.

Whether or not the fluororesin has a crosslinked structure can be judged by the gel fraction.

In this specification, the gel fraction is obtained by the following procedure.

First, a fluororesin layer is added to tetrahydrofuran so that the concentration becomes 5 mass %, and the mixture is left to stand for 16 hours to dissolve a soluble component. Then, the supernatant is collected and dropwise added to ethanol to precipitate an ethanol-insoluble matter. The precipitate is collected, dried at 60° C. for 1 hour, the mass of the precipitate is measured, and the gel fraction can be calculated from the following formula.

Gel fraction (%)=($w1-w2$)/$w1$×100

Here, w1 is the mass of the fluororesin layer added to tetrahydrofuran, and w2 is the mass of the precipitate.

When the gel fraction is at least 90%, it is judged that the fluororesin has a crosslinked structure.

The crosslinked structure of the fluororesin is preferably a co-crosslinked structure of the below-mentioned fluorinated polymer, the below-mentioned non-fluorinated compound and the curing agent.

Mc of the fluororesin is more than 50,000 and at most 100,000, more preferably from 60,000 to 90,000, particularly preferably from 70,000 to 80,000. When Mc is within the above range, the stretchability of the fluororesin layer is excellent, and, as a result, cracking in the present decorative film will be suppressed.

The method for adjusting Mc may be a method of adjusting Mn and an addition amount of the fluorinated polymer as described later, or Mw and an addition amount of the non-fluorinated compound as described later, or a method of selecting a predetermined curing agent.

The fluororesin layer contains a urethane bond and an allophanate bond.

The urethane bond and the allophanate bond contained in the fluororesin layer can be confirmed by an IR-analysis of the fluororesin layer and detecting the peak of the urethane bond and the peak of the allophanate bond. For the IR analysis, for example, FT/IR-600 manufactured by JASCO Corporation may be used.

Since the fluororesin layer contains a urethane bond and an allophanate bond, it is considered possible to suppress cracking during molding of the decorative film by the improvement in strength of the fluororesin layer due to the urethane bond and by the balance of the stretchability and the restoring force due to the allophanate bond at the time when the fluororesin layer is expanded and contracted.

The urethane bond is a bond represented by —NH—COO—. A specific example of the method for introducing a urethane bond into the fluororesin layer may be a method of forming a fluororesin by reacting a fluorinated polymer having a hydroxy group as a crosslinkable group with polyisocyanate as a curing agent. It is preferred that the present decorative film further contains a urethane bond other than the urethane bond formed by the reaction between the hydroxy group of the fluorinated polymer and the isocyanate group of the curing agent. Such a urethane bond may be a urethane bond that is contained in advance in the curing agent, and the curing agent that contains the urethane bond may, for example, be an adduct body of polyisocyanate (hereinafter simply referred to also as an adduct body). By crosslinking the curing agent containing a urethane bond and the fluorinated polymer to form a fluororesin, a urethane bond that is not directly crosslinked with the fluorinated polymer will be introduced into the fluororesin layer. It is considered that such a urethane bond has a high degree of rotational freedom, and, as a result, the stretchability of the fluororesin layer will be improved.

The allophanate bond is a bond represented by —NH—CO—N(R)—COO— (R: a hydrogen atom or a monovalent organic group). A specific example of the method for introducing an allophanate bond into the fluororesin layer may be a method of forming a fluororesin by using a curing agent containing an allophanate bond (for example, an allophanate body of polyisocyanate; hereinafter simply referred to also as an allophanate body). More specifically, when a fluorinated polymer having a hydroxy group as a crosslinkable group is reacted with an allophanate body, a fluororesin containing an allophanate bond will be formed. The allophanate bond is preferably a bond formed by using the above allophanate body from the viewpoint of the restoring force of the present decorative film.

That is, the urethane bond and the allophanate bond contained in the fluororesin layer are preferably bonds included in the crosslinked structure of the fluorinated polymer having a hydroxy group, the adduct body, and the allophanate body. Further, from the viewpoint of adjusting Mc of the fluororesin layer, the urethane bond and allophanate bond contained in the fluororesin layer are preferably bonds included in the co-crosslinked structure of a fluorinated polymer having a hydroxy group, an adduct body, an allophanate body, and a non-fluorinated compound as described later.

The fluororesin layer is a layer containing a fluororesin. The fluororesin is a resin containing fluorine atoms and being solid at room temperature (about 25° C.), and may be formed by using, for example, a fluorinated polymer as described later. Particularly, the fluororesin is preferably a crosslinked product formed by crosslinking a fluorinated polymer, a non-fluorinated compound having a crosslinkable group and a curing agent, as described later.

The fluororesin layer may also have the function of a design layer as described later. In such a case, a fluororesin layer having a function as a design layer may be obtained by letting the fluororesin layer contain a colorant or the like.

The thickness of the fluororesin layer is preferably from 1 to 300 μm, more preferably from 3 to 200 μm, particularly preferably from 5 to 100 μm.

The total light transmittance of the fluororesin layer is preferably at least 70%, more preferably at least 80%, particularly preferably at least 90%, from the viewpoint of the design property of the three-dimensional molded product provided with the present decorative film.

The fluororesin is preferably formed by using a fluorinated polymer containing units based on a fluoroolefin (hereinafter referred to also as units F) and units having a first crosslinkable group (hereinafter referred to as units C). In other words, the fluororesin layer is preferably formed by using a composition containing the above-mentioned fluorinated polymer (hereinafter referred to also as a composition (f)).

When the above fluorinated polymer is used, the crosslinkable group of the fluorinated polymer may be reacted to form a fluororesin having a crosslinked structure. Here, at the time of reacting the crosslinkable group, a predetermined curing agent may be used as described later.

The fluoroolefin is an olefin in which at least one hydrogen atom has been replaced by a fluorine atom. In the fluoroolefin, at least one hydrogen atom which is not substituted by a fluorine atom may be substituted by a chlorine atom. The number of carbon atoms in the fluoroolefin is preferably from 2 to 8, particularly preferably from 2 to 4.

Specific examples of the fluoroolefin include $CF_2=CF_2$, $CF_2=CFCl$, $CF_2=CHF$, $CH_2=CF_2$, $CF_2=CFCF_3$, $CF_2=CHCF_3$, $CF_3CH=CHF$ and $CF_3CF=CH_2$. As the fluoroolefin, from the viewpoint of copolymerizability, $CF_2=CF_2$, $CF_2=CFCl$, $CF_3CH=CHF$ and $CF_3CF=CH_2$ are preferred; $CF_2=CF_2$ and $CF_2=CFCl$ are more preferred, and $CF_2=CFCl$ is particularly preferred.

As the fluoroolefin, two or more types may be used in combination.

From the viewpoint of the weather resistance of the present decorative film, the content of units F is preferably from 20 to 70 mol %, more preferably from 40 to 60 mol %, particularly preferably from 45 to 55 mol %, to all units contained in the fluorinated polymer.

Units C may be units based on a monomer having a first crosslinkable group (hereinafter referred to also as a monomer C), or may be units obtainable by converting the crosslinkable group of the fluorinated polymer containing units C to a different crosslinkable group. Such units may be units obtainable by reacting a fluorinated polymer containing units having a hydroxy group with a polycarboxylic acid or an acid anhydride thereof, and converting part or all of the hydroxy groups into carboxy groups. Units C preferably have no fluorine atom.

Specific examples of the first crosslinkable group include a hydroxy group, a carboxy group, an amino group, an alkoxysilyl group, an epoxy group and an oxetanyl group, and from such a viewpoint that the impact resistance, flexibility and chemical resistance of the fluororesin layer will be further improved, a hydroxy group is preferred. In particular, in a case where at least part of urethane bonds and allophanate bonds in the fluororesin layer is formed by the crosslinking of the fluorinated polymer containing units C with the adduct body and allophanate body of polyisocyanate, from such a viewpoint that the reactivity of the crosslinking reaction will be excellent, the first crosslinkable group is preferably a hydroxy group. The first crosslinkable group may be the same as or different from the second crosslinkable group in the non-fluorinated compound as described later.

As the monomer C, two or more types may be used in combination.

Further, units C may have two or more types of crosslinkable groups.

As the monomer C in which the crosslinkable group is a hydroxy group, allyl alcohol, and vinyl ethers, vinyl esters, allyl ethers, allyl esters, (meth)acrylates having a hydroxy group, may be mentioned, and allyl alcohol and a monomer represented by $X^{11}$—$Z^{11}$ (hereinafter referred to also as a monomer C1) are preferred.

$X^{11}$ is $CH_2=CHC(O)O—$, $CH_2=C(CH_3)C(O)O—$, $CH_2=CHOC(O)—$, $CH_2=CHCH_2OC(O)—$, $CH_2=CHO—$ or $CH_2=CHCH_2O—$; and $CH_2=CHO—$ or $CH_2=CHCH_2O—$ is preferred.

$Z^{11}$ is a $C_{2-42}$ monovalent organic group having a hydroxy group. The organic group may be linear or branched. Further, the organic group may be made of a ring structure or may contain a ring structure.

As the above organic group, a $C_{2-6}$ alkyl group having a hydroxy group, an alkyl group containing a $C_{6-8}$ cycloalkylene group having a hydroxy group, and a polyoxyalkylene group having a hydroxy group are preferred.

Specific examples of the monomer C1 include $CH_2=CHO—CH_2$-cyclo$C_6H_{10}$—$CH_2OH$, $CH_2=CHCH_2O—CH_2$-cyclo$C_6H_{10}$—$CH_2OH$, $CH_2=CHOCH_2CH_2OH$, $CH_2=CHCH_2OCH_2CH_2OH$, $CH_2=CHOCH_2CH_2CH_2OH$, $CH_2=CHCH_2OCH_2CH_2CH_2OH$, and $CH_2=CHOCH_2$-cyclo$C_6H_{10}$—$CH_2O(CH_2CH_2O)_{15}H$.

Here, "-cyclo$C_6H_{10}$—" represents a cyclohexylene group, and the binding site of (-cyclo$C_6H_{10}$—) is usually 1,4-.

As the monomer C1, two or more types may be used in combination.

As the monomer C in which the crosslinkable group is a carboxy group, an unsaturated carboxylic acid, (meth)acrylic acid, etc. may be mentioned, and a monomer represented by the formula $X^{12}$—$Z^{12}$ (hereinafter referred to also as a monomer C2) is preferred.

$X^{12}$ is $CH_2=CH—$, $CH(CH_3)=CH—$ or $CH_2=C(CH_3)—$, and preferably $CH_2=CH—$ or $CH(CH_3)=CH—$.

$Z^{12}$ is a carboxy group or a $C_{1-12}$ monovalent saturated hydrocarbon group having a carboxy group, and is preferably a carboxy group or a $C_{1-10}$ carboxyalkyl group.

Specific examples of the monomer $C_2$ may be $CH_2=CHCOOH$, $CH(CH_3)=CHCOOH$, $CH_2=C(CH_3)COOH$, and a compound represented by the formula $CH_2=CH(CH_2)_{n1}COOH$ (wherein n1 represents an integer of from 1 to 10).

As the monomer C2, two or more types may be used in combination.

As the monomer C, only one of the monomers C1 and C2 may be used, or both may be used. From the viewpoint that a urethane bond and an allophanate bond can be preferably introduced into the fluororesin layer, it is preferred to use the monomer C1 as the monomer C.

The content of units C is preferably from 0.5 to 40 mol %, more preferably from 3 to 35 mol %, further preferably from 3 to 30 mol %, particularly preferably from 5 to 25%, most preferably from 5 to 20 mol %, to all units contained in the fluorinated polymer. When the content of units C is at least 0.5 mol %, the present decorative film will be excellent in moldability. When the content of units C is at most 40 mol %, the stretchability of the present decorative film will be excellent.

The fluorinated polymer preferably further contains units (hereinafter referred to also as units D) based on at least one type of monomer (hereinafter referred to also as a monomer D) selected from the group consisting of vinyl ether, vinyl ester, allyl ether, allyl ester and (meth)acrylate.

The monomer D is a unit having no crosslinkable group. Further, the monomer D preferably does not contain a fluorine atom.

As units D, units based on a monomer represented by the formula $X^2$—$Y^2$ are preferred.

$X^2$ is $CH_2$=$CHC(O)O$—, $CH_2$=$C(CH_3)C(O)O$—, $CH_2$=$CHOC(O)$—, $CH_2$=$CHCH_2OC(O)$—, $CH_2$=$CHO$— or $CH_2$=$CHCH_2O$—; from such a viewpoint that weather resistance of the present decorative film will be excellent, it is preferably $CH_2$=$CHOC(O)$—, $CH_2$=$CHCH_2OC(O)$—, $CH_2$=$CHO$— or $CH_2$=$CHCH_2O$—, particularly preferably $CH_2$=$CHO$—.

$Y^2$ is a $C_{1-24}$ monovalent hydrocarbon group. The monovalent hydrocarbon group may be linear or branched. Further, the monovalent hydrocarbon group may be made of a ring structure or may contain a ring structure. Further, the monovalent hydrocarbon group may be a monovalent saturated hydrocarbon group or a monovalent unsaturated hydrocarbon group.

As the monovalent hydrocarbon group, an alkyl group, a cycloalkyl group, an aryl group, an aralkyl group and a cycloalkylalkyl group are preferred; and a $C_{2-12}$ alkyl group, a $C_{6-10}$ cycloalkyl group, a $C_{6-10}$ aryl group, a $C_{7-12}$ aralkyl group and a $C_{6-10}$ cycloalkylalkyl group are particularly preferred.

Specific examples of the alkyl group include a methyl group, an ethyl group, a tert-butyl group, a hexyl group, a nonyl group, a decyl group and a dodecyl group.

A specific example of the cycloalkyl group may be a cyclohexyl group.

A specific example of the aralkyl group may be a benzyl group.

A specific example of the cycloalkylalkyl group may be a cyclohexylmethyl group.

Specific examples of the aryl group include a phenyl group and a naphthyl group.

Here, a hydrogen atom in the cycloalkyl group or the cycloalkyl portion of the cycloalkylalkyl group, or in the aryl group or the aryl portion of the aralkyl group, may be substituted by an alkyl group. In such a case, the number of carbon atoms in the alkyl group as a substituent is not included in the number of carbon atoms in the cycloalkyl group, the aryl group or the aralkyl group.

As the monomer D, two or more types may be used in combination.

Specific examples of the monomer D include ethyl vinyl ether, tert-butyl vinyl ether, 2-ethylhexyl vinyl ether, cyclohexyl vinyl ether, vinyl acetate, vinyl pivalate, vinyl neononanoate (trade name "Veova 9", manufactured by Hexion Co., Ltd.), vinyl neodecanoate (trade name "Veova 10", manufactured by Hexion Co., Ltd.), vinyl versatate, vinyl benzoate, tert-butyl vinyl benzoate, tert-butyl (meth)acrylate, and benzyl (meth)acrylate.

The content of units D is preferably from 5 to 60 mol %, particularly preferably from 10 to 50 mol %, to all units contained in the fluorinated polymer.

The fluorinated polymer preferably contains units F, units C and units D in amounts of from 20 to 70 mol %, from 0.5 to 40 mol % and from 5 to 60 mol % in this order, to all units contained in the fluorinated polymer.

Tg of the fluorinated polymer is preferably from 10 to 150° C., more preferably from 25 to 120° C., particularly preferably from 30 to 100° C., from the viewpoint of excellent scratch resistance of the present decorative film.

Mn of the fluorinated polymer is preferably from 1,000 to 50,000, more preferably from 3,000 to 30,000, further preferably from 5,000 to 25,000, particularly preferably from 7,000 to 20,000, from the viewpoint of the followability of the fluororesin layer and with a view to adjusting Mc of the fluororesin layer.

Two or more types of fluorinated polymer may be used from the viewpoint of providing the followability of the fluororesin layer and the scratch resistance of the present decorative film. Here, in a case where two or more types of fluorinated polymer are used, Mn of the fluorinated polymer to be used to form the fluororesin layer means the weighted average value having Mn of each fluorinated polymer weighted by the content of each fluorinated polymer.

The ratio of Mn of the fluorinated polymer to Mc of the fluororesin (Mn of the fluorinated polymer/Mc of the fluororesin) is preferably from 0.01 to 15, more preferably from 0.05 to 5, particularly preferably from 0.1 to 0.5. When the above ratio is within the above range, cracking at the time of stretching of the present decorative film will be further suppressed. The reason for this is considered to be because the energy in the fluororesin layer generated by the stretching is controlled in a fixed direction.

In a case where the fluorinated polymer has a hydroxy group, the hydroxy value of the fluorinated polymer is preferably from 1 to 150 mgKOH/g, more preferably from 10 to 150 mgKOH/g, particularly preferably from 10 to 120 mgKOH/g, most preferably from 30 to 100 mgKOH/g, from the viewpoint of the curability of the present decorative film.

In a case where the fluorinated polymer has a carboxy group, the acid value of the fluorinated polymer is usually from 1 to 150 mgKOH/g, particularly preferably from 10 to 40 mgKOH/g.

The fluorinated polymer may have both an acid value and a hydroxy value. From such a viewpoint that a urethane bond and an allophanate bond can be suitably introduced into the fluororesin layer, it is preferred to employ a fluorinated polymer having a hydroxy value.

Specific preferred embodiments of the fluorinated polymer are as follows.

A fluorinated polymer comprising units F based on $CF_2$=$CFCl$, units C based on at least one monomer selected from the group consisting of a vinyl ether having a hydroxy group and an allyl ether having a hydroxy group and units D based on at least one member selected from the group consisting of a vinyl ether and vinyl ester having no crosslinkable group.

A fluorinated polymer comprising units F based on $CF_2$=$CFCl$, units C based on at least one monomer selected from the group consisting of a vinyl ether having a hydroxy group and an allyl ether having a hydroxy group and units D based on at least one member selected from the group consisting of a vinyl ether and vinyl ester having no crosslinkable group, wherein the contents of the above units to all units which the fluorinated polymer has, are, respectively, from 40 to 60 mol %, from 3 to 40 mol % and from 5 to 60 mol %, in this order.

A fluorinated polymer comprising units F based on $CF_2$=$CFCl$, units C based on a vinyl ether having a hydroxy group, and units D based on a vinyl ether having no crosslinkable group, wherein the contents of the above units to all units which the fluorinated polymer has, are, respectively, from 45 to 55 mol %, from 3 to 40 mol % and from 5 to 60 mol %, in this order.

In the above embodiments, in the units which the fluorinated polymer contains, the alternating copolymerization rate of units F and units other than units F is likely to be at least 90%, and the present decorative film will be excellent in weather resistance. Further, since units C will be evenly arranged in the fluorinated polymer, it will be easy to uniformly set Mc of the fluororesin, and the present decorative film will be excellent in stretchability. Further, since Mc of the fluororesin becomes uniform, at the time when the fluororesin layer is stretched, it will be easy to control the energy in the fluororesin layer generated by the stretching in a certain direction, and thus, it will be easy to suppress cracking at the time when the present decorative film is stretched.

The content of the fluorinated polymer in the composition (f) is preferably from 5 to 90 mass %, particularly preferably from 40 to 80 mass %, to the total solid content of the composition (f), from the viewpoint of the weather resistance of the present decorative film.

The crosslinked structure of the fluororesin may be a crosslinked structure formed by a curing agent or the like, or may be a crosslinked structure formed directly by electron beam crosslinking or the like. In the crosslinking, the fluorinated polymers may be directly crosslinked with each other, or the fluoropolymers may be crosslinked via a curing agent or another compound.

The crosslinked structure of the fluororesin is preferably a co-crosslinked structure of the fluorinated polymer, the non-fluorinated compound and the curing agent. That is, the fluororesin layer is preferably formed by using the composition (f) comprising a fluorinated polymer, a non-fluorinated compound and a curing agent. In such a case, the fluorinated polymer has a first crosslinkable group, the non-fluorinated compound has a second crosslinkable group, and the curing agent has at least two groups capable of reacting with each of the first crosslinkable group and the second crosslinkable group, in one molecule.

The non-fluorinated compound in the present invention is a compound that does not contain a fluorine atom and is different from the fluorinated polymer and the curing agent as described later, and when this compound is used, a plurality of molecular chains of the fluorinated polymer will be present at mutually sufficient distances from one another, whereby the stretchability of the fluororesin layer will be more excellent. The non-fluorinated compound preferably has at least two second crosslinkable groups. The non-fluorinated compound may have at least two types of second crosslinkable groups.

Specific examples of the second crosslinkable group include a hydroxy group, a carboxy group, an amino group, an alkoxysilyl group, an epoxy group and an oxetanyl group. A hydroxy group and a carboxy group are preferred, and a hydroxy group is particularly preferred.

Particularly, as the non-fluorinated compound having a crosslinkable group, at least one type selected from the group consisting of a polyol and a polyester is preferred, and a polyol is particularly preferred.

As the polyol, at least one type selected from the group consisting of an acrylic polyol, a polyether polyol, a polyester polyol, a polyether ester polyol and a polycarbonate polyol, is preferred, and from the viewpoint of excellent stretchability of the present decorative film, an acrylic polyol is particularly preferred.

The acrylic polyol is a polymer containing units based on a (meth)acrylate having no hydroxy group and units based on a monomer having a hydroxy group, and is a compound having at least two hydroxy groups in one molecule. Specific examples of the monomer having a hydroxy group include hydroxyethyl (meth)acrylate, hydroxypropyl (meth)acrylate, 3-chloro-2-hydroxypropyl (meth)acrylate and allyl alcohol. The acrylic polyol may contain units other than the above, and examples thereof include (meth)acrylic acid, styrene, α-methylstyrene, vinyltoluene, (meth)acrylamide and its derivatives, vinyl acetate and maleic anhydride.

Mw of the non-fluorinated compound is preferably from 20,000 to 150,000, more preferably from 30,000 to 100,000, further preferably from 30,000 to 90,000, particularly preferably from 40,000 to 90,000.

When Mw of the non-fluorinated compound is within the above range, it becomes easy to adjust Mc of the fluororesin within a predetermined range.

In a case where the non-fluorinated compound has a hydroxy group as the second crosslinkable group, the hydroxy value of the non-fluorinated compound having the crosslinkable group is preferably from 10 to 150 mgKOH/g, more preferably from 20 to 130 mg KOH/g, particularly preferably from 30 to 70 mg KOH/g, from the viewpoint of the stretchability of the present decorative film. This makes it easier to adjust Mc of the fluororesin within the range as described below, whereby cracking at the time of stretching of the present decorative film will be further suppressed.

The content of the non-fluorinated compound in the composition (f) is preferably from 0.1 to 50.0 mass %, more preferably from 1.0 to 25.0 mass %, particularly preferably from 3.0 to 10.0 mass, to the total solid content of the composition (f).

The composition (f) may contain two or more types of non-fluorinated resin.

The curing agent in the present invention has at least two groups capable of reacting with each of the first crosslinkable group and the second crosslinkable group in one molecule. When the curing agent reacts with the first crosslinkable group of the fluorinated polymer and the second crosslinkable group of the non-fluorinated compound, the fluorinated polymer and the non-fluorinated compound will be crosslinked to form a fluororesin. The curing agent usually has from 2 to 30 groups capable of reacting with the crosslinkable groups.

In a case where the first crosslinkable group of the fluorinated polymer and the second crosslinkable group of the non-fluorinated compound are hydroxy groups, the curing agent is preferably a polyisocyanate.

The polyisocyanate is a compound having at least two isocyanate groups or blocked isocyanate groups in one molecule.

As the polyisocyanate, a polyisocyanate monomer or a polyisocyanate derivative is preferred.

The polyisocyanate monomer is preferably an alicyclic polyisocyanate, an aliphatic polyisocyanate or an aromatic polyisocyanate. The polyisocyanate derivative is preferably a multimer or modified product (adduct, allophanate, biuret, isocyanurate, etc.) of polyisocyanate monomer.

Specific examples of the aliphatic polyisocyanate include aliphatic diisocyanates such as tetramethylene diisocyanate, pentamethylene diisocyanate, hexamethylene diisocyanate, 2,2,4-trimethyl-1,6-diisocyanatohexane, lysine diisocyanate, etc., lysine triisocyanate, 4-isocyanatomethyl-1,8-octamethylene diisocyanate and bis(2-isocyanatoethyl) 2-isocyanatoglutarate.

Specific examples of the alicyclic polyisocyanate include alicyclic diisocyanates such as isophorone diisocyanate, 1,3-bis(isocyanatomethyl)-cyclohexane, 4,4'-dicyclohexylmethane diisocyanate, norbornene diisocyanate, hydrogenated xylylene diisocyanate, etc.

Specific examples of the aromatic polyisocyanate include aromatic diisocyanates such as xylylene diisocyanate, etc.

The polyisocyanate may be a compound in which at least two isocyanate groups of the above-mentioned polyisocyanate monomer or polyisocyanate derivative are blocked by a blocking agent.

The blocking agent is a compound having active hydrogen, and specific examples thereof include an alcohol, phenol, active methylene, amine, imine, acid amide, lactam, oxime, pyrazole, imidazole, imidazoline, pyrimidine and guanidine.

Particularly, it is preferred to use at least two types of polyisocyanate, and it is particularly preferred to use an adduct body of polyisocyanate and an allophanate body of polyisocyanate in combination.

Here, the adduct body is a general term for a bifunctional or higher functional isocyanate compound obtained by reacting a polyisocyanate having at least two isocyanate groups in one molecule (for example, a diisocyanate) and a difunctional or higher functional low-molecular-weight active hydrogen-containing compound (for example, a low molecular weight triol such as trimethylolpropane, glycerin, etc.). The adduct body may, for example, be a reaction product of trimethylolpropane and hexamethylene diisocyanate, a reaction product of trimethylolpropane and xylylene diisocyanate, a reaction product of trimethylolpropane and isophorone diisocyanate, etc. The adduct body is preferably one having three isocyanate groups from the viewpoint of excellent stretchability of the fluororesin layer.

The allophanate body includes a monoallophanate body and a polyallophanate body. The monoallophanate body is a polyisocyanate produced from two molecules of a diisocyanate and one molecule of an organic compound having one hydroxy group (for example, an alcohol), and has one allophanate bond and two isocyanate groups in the molecule. Whereas, the polyallophanate body is a polyisocyanate produced from a diisocyanate and an organic compound having a plurality of hydroxy groups, and has at least two allophanate groups and at least four isocyanate groups in the molecule. As the allophanate body, a monoallophanate body is preferred from the viewpoint of the excellent restoring force of the fluororesin layer.

Further, a curing agent other than a polyisocyanate may be used so long as the fluororesin layer contains a urethane bond and an allophanate bond.

A specific example of the curing agent other than a polyisocyanate may be a compound having at least two epoxy groups, carbodiimide groups, oxazoline groups or β-hydroxyalkylamide groups in one molecule.

The content of the curing agent (for example, a polyisocyanate) in the composition (f) is preferably from 5 to 50 mass %, particularly preferably from 15 to 30 mass %, to the total solid content of the composition (f).

The composition (f) preferably contains a polyisocyanate, and as the polyisocyanate, a combination of an adduct body and an allophanate body is preferred. In such a case, the content of the adduct body is preferably from 10 to 90 mass %, more preferably from 35 to 65 mass %, to the total mass of the polyisocyanate. Further, the content of the allophanate body in such a case is preferably from 10 to 90 mass %, more preferably from 35 to 65 mass % by mass, to the total mass of the polyisocyanate.

In a case where the composition (f) contains an adduct body and an allophanate body in combination as the polyisocyanate, the mass ratio of the allophanate body to the adduct body (allophanate body/adduct body) is preferably from 0.1 to 9, particularly preferably from 0.5 to 2.0, from such a viewpoint that the stretchability and the restoring force in the fluororesin layer will be more excellent.

The composition (f) may contain components (hereinafter referred to also as additives) other than the fluorinated polymer, the curing agent and the non-fluorinated compound, as the case requires. Such components may, for example, be a curing catalyst, a filler (an inorganic filler such as silica, an organic filler such as resin beads, etc.), a colorant (a dye, an organic pigment, an inorganic pigment, a bright pigment using a metal or mica, etc.), a ultraviolet absorber, a light stabilizer, a matting agent, a surface conditioner, a degassing agent, a packing agent, a heat stabilizer, a thickener, a dispersant, a surfactant, an antistatic agent, a rust inhibitor, a silane coupling agent, an antifouling agent, and a treatment agent for reducing pollution.

The composition (f) preferably contains a curing catalyst among the above additives. The curing catalyst is a compound that promotes the formation of a crosslinked structure to be formed by using a curing agent, and may be selected from known curing catalysts depending on the type of the curing agent.

Particularly, the curing catalyst is preferably a tin catalyst (tin octylate, tributyltin laurate, dibutyltin dilaurate, etc.) that accelerates the reaction of the isocyanate group.

As the curing catalyst, two or more types may be used in combination.

In a case where the composition (f) contains a curing catalyst, the content of the curing catalyst is preferably from 0.0001 to 5 mass %, particularly preferably from 0.05 to 1 mass %, to the total solid content of the composition (f).

The composition (f) preferably contains a surface conditioner among the above additives.

Specific examples of the surface conditioner include a silicone-type surface conditioner such as a polysiloxane and its modified product, and an acrylic surface conditioner such as an acrylic polymer and its modified product.

As the surface conditioner, a silicone-modified acrylic polymer is preferred.

Further, the surface conditioner may have a crosslinkable group such as a hydroxy group, and the surface conditioner may be crosslinked with a fluorinated polymer via a curing agent and be present as being incorporated in the fluororesin.

As the surface conditioner, two or more types may be used in combination.

In a case where the composition (f) contains a surface conditioner, the content of the surface conditioner is preferably from 0.5 to 10 mass %, particularly preferably from 1 to 5 mass %, to the total solid content of the composition (f).

The composition (f) is preferably obtained by mixing a fluorinated polymer, a curing agent, a non-fluorinated compound, and, as the case requires, at least one type of the above additives. In such a case, the composition (f) may contain a solvent (water, an organic solvent, etc.). When the composition (f) contains a solvent, the fluorinated polymer and the curing agent may be dissolved or dispersed in the solvent. The composition (f) may be a solvent-free powder type.

As the solvent, a solvent inert to the components contained in the composition (f) is used. For example, in a case where a curing agent having an isocyanate group is contained as the curing agent, a solvent not having a group capable of reacting with an isocyanate group such as a hydroxy group, is used.

In a case where the composition (f) contains a solvent, the solvent is preferably an organic solvent.

Specific examples of the organic solvent include a ketone, an ester and a hydrocarbon.

As the organic solvent, two or more types may be used in combination.

From the viewpoint of storage stability and coating efficiency of the composition of the present invention, the content of the organic solvent in the composition of the present invention is preferably from 10 to 90 mass %, particularly preferably from 25 to 50 mass %, to the total mass of the composition of the present invention.

A specific example of the method for forming the fluororesin layer may be a method in which the composition (f) is applied onto a base film to obtain a coating layer, and the obtained coating layer is cured to obtain a coating film.

Specific examples of the coating method include methods of using a spray, an applicator, a die coater, a bar coater, a roll coater, a comma coater, a roller brush, a brush and a spatula.

In a case where the composition (f) contains a solvent, the composition (f) may be coated and then heated and dried to remove the solvent in the composition (f).

The curing of the coating layer can be carried out, for example, by heating. The heating temperature is preferably from 30 to 250° C., preferably from 50 to 150° C.

Further, in a case where the composition (f) is a so-called powder coating material, the fluororesin layer can also be formed by electrostatic coating or the like.

A particularly preferred embodiment as the composition (f) for forming the fluororesin layer of the present decorative film is as follows.

A composition comprising a fluorinated polymer which contains units F and units based on a monomer having a hydroxy group and which has a Mn of from 3,000 to 30,000, a non-fluorinated compound which has a hydroxy group and which has a Mw of from 30,000 to 90,000, an adduct body of polyisocyanate and an allophanate body of polyisocyanate.

By using the above composition (f), it is possible to preferably form a fluororesin layer containing a fluororesin which contains a urethane bond and an allophanate bond, and has a Mc of more than 50,000 and at most 100,000.

The fluororesin layer may be composed solely of the fluororesin or may contain components other than the fluororesin. Examples of the components other than the fluororesin include the additives described above as the components that may be contained in the composition (f). Further, the fluororesin layer may partially contain a fluorinated polymer, a curing agent and a non-fluorinated compound in a non-crosslinked state.

It is preferred that the present decorative film has a bonding layer from the viewpoint of adhesion to a three-dimensional molded product.

The bonding layer is a layer for bonding the present decorative film and the three-dimensional molded product, and preferably contains a bonding resin. Specific examples of the bonding resin include an adhesive resin, a fusible resin and a sticky resin. The bonding layer can be formed by using, for example, a bonding resin or a composition containing a component which becomes a bonding resin by reacting under heating or the like. Hereinafter, the composition containing a component which becomes a bonding resin by reacting under heating or the like will be referred to also as a composition (a).

The bonding resin is preferably a heat-fusible resin or a heat-crosslinkable resin. In the case of a heat-fusible resin, the heat-softened resin can be cooled and solidified in a state of being in contact with the surface of the three-dimensional molded product, to be bonded to the surface. In the case of a thermally crosslinkable resin, the resin can be thermally crosslinked in a state of being in contact with the surface of the three-dimensional molded article, to be bonded to the surface.

A specific example of the heat-fusible resin may be a partially crosslinked heat-fusible resin having a low softening temperature, or a thermoplastic resin. The bonding layer containing the heat-fusible resin can be formed by using the heat-fusible resin or the composition (a). For example, by using the composition (a) containing a polyol and a polyisocyanate, it is possible to form a bonding layer containing a heat-fusible polyurethane resin.

The softening temperature of the heat-fusible resin is preferably from 20 to 100° C., particularly preferably from 25 to 90° C., from the viewpoint of blocking resistance and moldability of the present decorative film.

Mw of the heat-fusible resin is preferably from 5,000 to 150,000, particularly preferably from 6,000 to 130,000, from the viewpoint of film-forming property and adhesiveness of the bonding layer.

As the heat-fusible resin, a heat-fusible urethane resin, (meth)acrylic resin, olefin resin, vinyl chloride-vinyl acetate resin, or butyral resin, is preferred, because the adhesion to a three-dimensional molded product will be excellent.

The bonding resin may be a heat-crosslinkable resin containing a main resin and a curing agent. As such a heat-crosslinkable resin, a heat-crosslinkable urethane resin comprising a solid polyol or a solid hydroxy-terminated polyurethane prepolymer, and a solid polyisocyanate or a solid blocked polyisocyanate, or an epoxy resin comprising a solid polyepoxide and a solid epoxy resin curing agent, may be mentioned.

The composition (a) may contain the above-mentioned heat-crosslinkable resin, or may be one containing a component which becomes the heat-crosslinkable resin.

The bonding layer may also have a function of a design layer as described later. In such a case, it is possible to obtain the bonding layer having a function as a design layer, by letting a coloring agent be incorporated in the bonding layer.

The bonding layer may contain components other than the above. Specific examples of components other than the above include a ultraviolet absorber, a light stabilizer, a curing catalyst, an antioxidant, a surface conditioner, an anti-sagging agent, a thickener, a defoamer and a conductive filler.

The thickness of the bonding layer is preferably from 1 to 1,000 μm, more preferably from 4 to 80 μm, particularly preferably from 10 to 60 μm, from the viewpoint of film forming property and adhesiveness of the bonding layer.

The components that the composition (a) may contain are the same as the components that the bonding layer may contain. The components that the bonding resin and the bonding layer may contain may be dissolved or dispersed in the composition (a) by a solvent such as water or an organic solvent.

In the example in FIG. 1, description has been made with reference to a case where the decorative film 10 has the bonding layer 12. However, so long as the present decorative film can be bonded to a three-dimensional molded product, the present decorative film may not have a bonding layer.

That is, the present decorative film may have at least the base film and the fluororesin layer.

Although not shown in FIG. 1, the present decorative film may have a design layer in order to improve the designability, etc. of the decorative film. The design layer is a layer for imparting a design property to the three-dimensional molded product. The design layer is preferably arranged between the bonding layer and the fluororesin layer.

Specifically, in a case where the decorative film 10 of FIG. 1 has a design layer, an embodiment in which the bonding layer 12, the design layer, the base film 14 and the fluororesin layer 16 are arranged in this order, and an embodiment in which the bonding layer 12, the base film 14, the design layer and the fluororesin layer 16 are arranged in this order, may be mentioned.

The bonding layer, the base film or the fluororesin layer may also serve as a design layer, and in such a case, the design layer may not be provided.

Specific examples of the design layer may be a layer formed by using the composition for forming the design layer, a layer formed by a printing method, and a layer formed by a metal vapor deposition method.

Specific examples of the components contained in the composition may be a binder resin (a urethane resin, a (meth)acrylic resin, etc.), a colorant (a dye, an organic pigment, an inorganic pigment, a bright pigment using metal or mica, etc.), and a solvent (water, an organic solvent, etc.).

A layer formed by the printing method is formed by using an ink (for example, containing a binder resin, a colorant and a solvent) suitable for each printing method such as inkjet printing, screen printing, offset printing, and flexographic printing.

A layer formed by the metal vapor deposition method is formed by using a metal such as aluminum, indium, or tin. The above layer is preferably formed by using indium, from such a viewpoint that it will be easy to transmit radio waves and will be suitable for use in automobiles.

The design layer may contain components other than the above components as the case requires, and specifically, the components listed in the composition (a) and the components listed in the composition (f) as described above, may be mentioned.

The thickness of the design layer may be suitably set depending on the application.

The present decorative film may have a layer other than the above, and, for example, a layer that may be provided for the purpose of protecting a design layer or improving chemical resistance between the base film and the fluororesin layer. Such a layer is preferably provided in contact with the design layer. As a specific example, the protective layer may be formed by using a resin such as a (meth)acrylic resin, a urethane resin, an ABS resin, a polyethylene terephthalate, etc., and a polyethylene terephthalate is preferred. In particular, by disposing a base film, an indium-vapor deposited polyethylene terephthalate, and a fluororesin layer in this order, it is possible to obtain a decorative film excellent in designability and chemical resistance between layers. Further, between the respective layers, a urethane resin layer or the like for increasing the adhesion between the layers may be provided.

The present decorative film is obtainable, for example, by applying the composition (f) on one surface of a base film and curing the composition to form a fluororesin layer. Otherwise, the present decorative film may be obtained by separately producing a fluororesin layer and laminating it with a base film. The laminating method is not particularly limited.

The present decorative film is preferably used as being stretched in order to impart a design property to the object to be decorated (for example, a three-dimensional molded product as described later) or to protect the surface of the object to be decorated, and it is particularly preferably used as being stretched at least 1.2 times. The stretching direction and the stretching method may be suitably selected depending on the shape of the three-dimensional molded product, the manufacturing conditions during molding, etc. The stretching direction may be any direction, and the stretching method may be any method. That is, the stretching of the present decorative film may be carried out by pulling the present decorative film in a predetermined one direction or all directions, or may be carried out by suitably heating and expanding the present decorative film.

The three-dimensional molded product provided with a decorative film of the present invention (hereinafter referred to also as the present molded product) is preferably obtained by press-bonding the present decorative film and the surface to be decorated of the three-dimensional molded product under reduced pressure.

The press-bonding method under reduced pressure in the method for producing the present molded product is referred to also as a vacuum molding method (overlay molding method), and may be carried out, for example, by using a double-sided vacuum molding apparatus. Since the decorative film of the present invention is less likely to undergo cracking when it is bonded to a three-dimensional molded product in a stretched state, even in a vacuum forming method in which the strain at the end of the film is large and cracking is likely to occur, it is possible to suppress cracking at the end of the film.

Under reduced pressure means a state in which the pressure is lower than the standard atmospheric pressure. The pressure under reduced pressure is preferably at most 70 kPa.

Further, the three-dimensional molded product provided with a decorative film of the present invention may optionally be obtained by a molding method other than the vacuum molding method. Specific examples of such a molding method include in-mold molding, in-mold transfer molding, in-mold sticking composite type, overlay transfer molding, overlay sticking composite type, and hydraulic transfer. Further, the decorative film may be press-bonded to a three-dimensional molded product before molding and then processed to obtain a three-dimensional molded product provided with a decorative film.

Specific examples of the material constituting the three-dimensional molded product include a polypropylene, an ABS resin, an AAS resin, an AES resin and a polycarbonate.

Specific examples of three-dimensional molded product include automobile exterior parts such as a door mirror, a front under spoiler, a rear under spoiler, a side under skirt, a bumper and a side garnish, and automobile interior parts such as a center console, an instrument panel and a door switch panel. In addition to the above, the present decorative film may be suitably used for a liquid crystal surface of a display, a wall material, a signboard, etc.

Since this decorative film is less likely to undergo cracking when it is bonded to a three-dimensional molded product while being stretched or in a stretched state, it is suitably used for decorating a three-dimensional molded product to be used for automobile exterior parts or automobile interior parts. Here, in the present specification, the term "decorating" means imparting a design property to the surface of a product, protecting the surface, etc.

Further, the composition (f) for forming the fluororesin layer in the present decorative film suppresses cracking at the time of stretching in the coating film to be formed, and thus, even when the base material itself is three-dimensionally molded after the composition (f) is applied on the base film to form a coating film, it is possible to produce a three-dimensional molded product provided with a coating film, having excellent followability to the base material and being less susceptible to cracking.

EXAMPLES

Hereinafter, the present invention will be described in detail with reference to Examples. However, the present invention is not limited to these Examples. Here, the blend amounts of the respective components in the Table given later show a mass standard. Further, Ex. 1 and 2 are Examples of the present invention, and Ex. 3 and 4 are Comparative Examples.

<Abbreviations and Details of Components Used>
[Fluororesin Layer]

Fluorinated polymer: A polymer comprising units based on CTFE (chlorotrifluoroethylene), units based on EVE (ethyl vinyl ether), units based on CHVE (cyclohexyl vinyl ether) and units based on HBVE (4-hydroxybutyl vinyl ether) in amounts of 50 mol %, 25 mol %, 15 mol % and 10 mol % in this order to all units contained in the fluorinated polymer (hydroxy value: 52 mgKOH/g, Tg: 40° C., Mn: 20,000)

Acrylic resin 1: 6FH-026 (50 mass % solution of acrylic polyol, hydroxy value: 65 mg KOH/g, Mw: 70,000, Tg: 35° C., trade name of Taisei Fine Chemical Co., Ltd.)

Acrylic resin 2: 8UA-600 (56 mass % solution of hydroxy group-containing acrylic urethane, hydroxy value: 30 mg KOH/g, Mw: 15,000, Tg: 98° C., trade name of Taisei Fine Chemical Co., Ltd.)

Solvent: Butyl acetate

Curing agent 1: Duranate E405-70B (adduct of hexamethylene diisocyanate, trade name of Asahi Kasei Corporation)

Curing agent 2-1: Duranate D-201 (allophanate of hexamethylene diisocyanate, trade name of Asahi Kasei Corporation)

Curing agent 2-2: Coronate 2793 (allophanate of hexamethylene diisocyanate, trade name of Tosoh Corporation)

Curing catalyst: dibutyltin dilaurate

Surface conditioner: BYK-SILCLEAN 3700 (silicone-modified acrylic polymer, manufactured by BYK)

Ex. 1 to 4

<Production of Composition (f)>

The respective components described in Table 1 were mixed to obtain compositions (f1) to (f4). Details of the added amounts of the respective components are shown in Table 1 given later.

<Measurement of Gel Fraction>

On one surface of the polypropylene resin plate, the composition (f1) was applied by using an applicator, dried at 25° C., and then heated at 80° C. for 5 minutes to be cured, to form a fluororesin layer having an average thickness of 20 μm. The obtained fluororesin layer was peeled off from the polypropylene resin plate to obtain a fluorinated film (1). Using the fluorinated film (1), the gel fraction was measured according to the procedure as described above, and from the obtained results, it was judged that the fluorinated film (1) had a crosslinked structure.

Fluorinated films (2) to (4) were obtained in the same manner except that the composition (f1) was changed to the compositions (f2) to (f4), and the gel fractions were measured, whereby each was judged to have a crosslinked structure.

<Mc of Fluororesin Layer>

Using the fluorinated films (1) to (4), Mc was measured by the method as described above. The measured results are shown in the column for Mc in Table 1 given later.

<Production of Decorative Film>

The composition (f1) was applied onto one surface of a base film (polyethylene terephthalate) by using an applicator, dried at 25° C. and then heated at 80° C. for 5 minutes to be cured, to form a fluororesin layer having an average thickness of 20 μm, to obtain a decorative film (1).

Decorative films (2) to (4) were obtained in the same manner except that the composition (f1) was changed to the compositions (f2) to (f4), and subjected to the evaluations as described later.

<Production of Molded Product>

Using a double-sided vacuum molding apparatus, the decorative film (1) and a three-dimensional molded product (ABS panel) were heated at 140° C. for 1 minute while being press-bonded under reduced pressure by a vacuum molding method, to obtain a molded product (1) being a three-dimensional molded product provided with the decorative film. Molded products (2) to (4) were obtained in the same manner except that the decorative film (1) was changed to the decorative films (2) to (4) and subjected to the evaluations as described later.

The evaluation results are shown in Table 1 given later.

<Structure Contained in Fluororesin Layer>

The fluorinated films (1) to (4) were subjected to IR analysis by FT/IR-600 manufactured by JASCO Corporation to analyze the structure contained in the fluororesin layer. In the fluorinated films (1) to (3), peaks of a urethane bond and an allophanate bond were confirmed. In the fluorinated film (4), a peak of a urethane bond was confirmed, and a peak of an allophanate bond was not confirmed.

<Moldability of Decorative Film>

After producing the molded products (1) to (4), cracking at the end surfaces of the decorative films were visually confirmed and evaluated according to the following standards.

A: There is no cracking at the end surface of the decorative film.

B: Cracking exists at the end surface of the decorative film.

<Scratch Resistance of Decorative Film in Molded Product>

After rubbing the decorative film side surfaces of molded products (1) to (4) for 15 reciprocations with steel wool (#0000), the surfaces were visually observed and evaluated by the following standards. Here, the load on the steel wool at the time of rubbing the surfaces of the molded products was 200 g.

A: No scratch is observed on the surface of the fluororesin layer.

B: A scratch is observed on the surface of the fluororesin layer.

<Elongation of Decorative Film>

When the tensile test is performed in the long side direction by using Autograph AGS10KNG manufactured by Shimadzu Corporation and THERMOSTATIC CHAMBER Model: TCRI-200SP manufactured by Shimadzu Corporation, under the conditions of decorative film size: short side 10 mm×long side 100 mm, chuck distance: 50 mm, pulling speed: 50 mm/min. and the temperature of the tensile constant temperature bath of 23° C., the elongation rate of each of the decorative films (1) to (4) until cracking occurred (the length between chucks of the decorative film immediately before cracking occurred by the tensile test/the length between chucks before the tensile test×100) was measured.

A: The elongation rate of the decorative film is at least 150%.

B: The elongation rate of the decorative film is less than 150%.

TABLE 1

|  |  | Ex. | | | |
| --- | --- | --- | --- | --- | --- |
|  | Composition | 1 (f1) | 2 (f2) | 3 (f3) | 4 (f4) |
| Blend of composition (g) | Fluorinated polymer | 5 | 5 | 5 | 5 |
|  | Acrylic resin 1 | 0.5 | 0.5 |  | 0.5 |
|  | Acrylic resin 2 |  |  | 0.5 |  |
|  | Solvent | 5 | 5 | 5 | 5 |
|  | Curing agent 1 | 0.9 | 0.9 | 0.9 | 3 |
|  | Curing agent 2-1 | 0.9 |  | 0.9 |  |
|  | Curing agent 2-2 |  | 0.9 |  |  |
|  | Curing catalyst | 0.01 | 0.01 | 0.01 | 0.01 |
|  | Surface conditioner | 1 | 1 | 1 | 1 |
|  | Mc | 75,000 | 75,000 | 18,000 | 74,800 |
| Evaluations | Moldability | A | A | B | B |
|  | Scratch resistance | A | A | B | A |
|  | Elongation | A | A | B | A |

INDUSTRIAL APPLICABILITY

The decorative film of the present invention is suitable as a film to be bonded to the surface of a three-dimensional molded product such as an automobile interior/exterior product, which is used for the purpose of imparting a design property and protecting the surface.

This application is a continuation of PCT Application No. PCT/JP2019/023334, filed on Jun. 12, 2019, which is based upon and claims the benefit of priority from Japanese Patent Application No. 2018-113191 filed on Jun. 13, 2018. The contents of those applications are incorporated herein by reference in their entireties.

REFERENCE SYMBOLS

10: Decorative film
12: Bonding layer
14: Base film
16: Fluororesin layer

What is claimed is:

1. A decorative film comprising a base film and a fluororesin layer containing a fluororesin having a crosslinked structure, wherein:
   the fluororesin layer comprises a urethane bond and an allophanate bond,
   the average molecular weight between crosslinking points of the fluororesin is more than 50,000 and at most 100,000, and
   the crosslinked structure is a co-crosslinked structure of a fluorinated polymer containing units based on a fluoroolefin and units having a first crosslinkable group, a non-fluorinated compound having a second crosslinkable group, and a curing agent having at least two groups capable of reacting with each of the first crosslinkable group and the second crosslinkable group.

2. The decorative film according to claim 1, wherein the content of the units having the first crosslinkable group is from 3 to 30 mol % to all units which the fluorinated polymer contains.

3. The decorative film according to claim 1, wherein both the first crosslinkable group and the second crosslinkable group are hydroxy groups, and the curing agent is polyisocyanate.

4. The decorative film according to claim 3, wherein the curing agent is a curing agent containing an adduct body of polyisocyanate and an allophanate body of polyisocyanate.

5. The decorative film according to claim 4, wherein the mass ratio of the allophanate body to the adduct body is from 0.1 to 9.0.

6. The decorative film according to claim 1, wherein the ratio of the number average molecular weight of the fluorinated polymer to the average molecular weight between crosslinking points of the fluororesin is from 0.01 to 15.

7. The decorative film according to claim 1, wherein the number average molecular weight of the fluorinated polymer is from 3,000 to 30,000.

8. The decorative film according to claim 1, which is part of a three-dimensional molded automobile exterior part or automobile interior part.

9. The decorative film according to claim 1, wherein the average molecular weight between crosslinking points of the fluororesin is 60,000 to 90,000.

10. The decorative film according to claim 1, wherein the average molecular weight between crosslinking points of the fluororesin is 70,000 to 80,000.

11. A decorative film having a base film and a fluororesin layer containing a urethane bond and an allophanate bond, wherein:
   the fluororesin layer contains a fluororesin having a co-crosslinked structure of a fluorinated polymer containing units based on a fluoroolefin and 3 to 30 mol %, based on all units contained in the fluorinated polymer, of units having a hydroxy group, a non-fluorinated compound having a hydroxy group, and a curing agent containing an adduct body of polyisocyanate and an allophanate body of polyisocyanate wherein the mass ratio of the allophanate body to the adduct body is from 0.1 to 9.0; and
   the average molecular weight between crosslinking points of the fluororesin is more than 50,000 and at most 100,000.

* * * * *